United States Patent [19]
Bernadic et al.

[11] Patent Number: 5,549,425
[45] Date of Patent: Aug. 27, 1996

[54] INDEXABLE THREADING INSERT WITH PRESSED-IN CHIP BREAKER

[75] Inventors: Thomas Bernadic, Madison Hts.; Tony Lowe, Royal Oak; John Patterson, Hazel Park, all of Mich.

[73] Assignee: Valenite Inc., Madison Hts., Mich.

[21] Appl. No.: 268,899

[22] Filed: Jun. 29, 1994

[51] Int. Cl.⁶ .................................................. B23B 27/16
[52] U.S. Cl. ........................................ 407/114; 407/115
[58] Field of Search ................................ 407/113, 114, 407/115, 24, 25, 66, 80, 81; 82/110

[56] References Cited

U.S. PATENT DOCUMENTS

| | | | |
|---|---|---|---|
| 4,189,264 | 2/1980 | Kraemer | 407/114 X |
| 4,233,867 | 11/1980 | Zimmerman | 407/113 X |
| 4,572,713 | 2/1986 | Schmidt | 407/113 X |
| 4,669,925 | 6/1987 | Lowe et al. | |
| 4,705,434 | 11/1987 | Patterson et al. | |
| 4,854,785 | 8/1989 | Lowe et al. | 407/114 X |
| 5,059,070 | 10/1991 | Baker | 407/114 |
| 5,122,017 | 6/1992 | Niebauer | 407/114 |

FOREIGN PATENT DOCUMENTS

| | | | |
|---|---|---|---|
| 2407379 | 9/1974 | Germany | 407/114 |
| 1135944 | 12/1968 | United Kingdom | 407/113 |
| 84/02671 | 7/1984 | WIPO | 407/114 |

*Primary Examiner*—S. Thomas Hughes
*Attorney, Agent, or Firm*—Mary K. Cameron

[57] ABSTRACT

A two cutting edge, indexable insert with integral pressed-in chip breaker wherein the cutting edges are symmetrically inverted relative to each other to thereby provide indexing therebetween. Each cutting edge is provided with a plurality of noses and gullets. The shape of the noses and gullets is predetermined to provide a predetermined thread contour, such as a buttress thread form. Each pressed in chip breaker is spaced from the adjacent cutting edge by a land and is in the form of a raised island having an incident face contour corresponding to the nose-and-gullet shape of the adjacent cutting edge. Each land is angled such that when the insert is mounted for use with an intended inclination, portions of the land are at neutral rake when engaging a workpiece.

11 Claims, 2 Drawing Sheets

INDEXABLE THREADING INSERT WITH PRESSED-IN CHIP BREAKER

BACKGROUND OF THE INVENTION

1. Field of the Invention

The present invention relates to apparatus for providing thread forms on a workpiece, and more particularly to threading inserts and chip breakers used therefor. Still more particularly, the present invention relates to a threading insert which is indexable and integrally incorporates a pressed-in chip breaker. Still more particularly, the present invention relates to an indexable threading insert with integral pressed-in chip breaker for providing buttress thread forms on a workpiece, especially of the kind used commonly in the oil patch industry.

2. Description of the Related Art

Threading of a workpiece is conventionally performed using a positive, precision ground flat-face threading insert. The conventional threading insert is presented in a neutral position to the centerline of the workpiece, which requires that the conventional threading insert have a positive clearance angle. This positive geometry limits the number of cutting edges to just one. The conventional threading insert is used in conjunction with an adjoining, separate, inclined surface mechanical chip breaker. The conventional threading insert and mechanical chip breaker are seated in a pocket of a toolholder for providing selected engagement with respect to a workpiece to thereby provide it with threads.

While the conventional threading insert performs its thread cutting function adequately, there yet remains the problem that when the conventional threading insert cutting edge becomes dull or otherwise unacceptable, the threading insert must be replaced with a new or resharpened one.

Conventional mechanical chip breakers are ground in the form of an inclined plane, having a pointed edge adjacent the cutting edge of the threading insert, inclining increasingly with increasing distance from the cutting edge of the threading insert, and terminating in a planar face. The conventional mechanical chip breaker produces very long, razor-like, wiry chips which can damage the threading insert, the toolholder, the workpiece, or the operator. Further, these chips are difficult to collect and pose disposal handling problems.

Still further, the optimum position of the conventional mechanical chip breaker with respect to the cutting edge of the threading insert is almost impossible to consistently achieve. As a result, material build-up between the mechanical chip breaker and the threading insert can be expected to occur. This build-up ultimately can cause poor part finish, premature insert failure, and even possible insert breakage.

It is ideal for the workpiece to be broken into manageable chips in the form of "C's" and "9's" which are narrower than the threads being formed. Narrowing the removed material helps to initiate chip control by bending the material away from the sides of the thread grooves, thereby concentrating the stress and strain properties of the material toward the center of the chips. Thus, the prior art chip breaker suffers from being deficient in chip management.

The ability of pressing a chip breaker form onto a positive threading insert is virtually impossible. When pressing into a positive die cavity, a neutral press land cannot be avoided when the green insert is ejected. A neutral press land prevents the insert from having a sharp edge at the intersection of the relief angle and its rake face. Pressing a positive insert without the appearance of a press land presents a major problem with current manufacturing techniques.

Accordingly, what remains needed in the art is a threading insert which is indexable and provided with an integral chip breaker having ideal chip management characteristics, particularly a threading insert and integral chip breaker for providing buttress thread forms on a workpiece.

SUMMARY OF THE INVENTION

The present invention is a double cutting edge, indexable threading insert with an integral pressed-in chip breaker having ideal chip management characteristics, particularly a threading insert and integral chip breaker for providing buttress thread forms on a workpiece.

The indexable threading insert according to the present invention has a substantially diamond shape, defined by: a first planar face; an opposite second planar face; two insert faces, wherein a first insert face extends between a first land and the second planar face and a second insert face extends between a second land and the first planar face and wherein the first and second insert faces mutually adjoin a first corner; two insert sidewalls extending between the first and second planar faces and which mutually adjoin a second corner opposite the first corner; and two cutting edges, wherein a first cutting edge is formed at the intersection of the first insert face and the first land and wherein a second cutting edge is formed at the intersection of the second insert face and the second land and wherein the first and second cutting edges are symmetrically inverted relative to each other to thereby provide indexing therebetween within ANSI and ISO standards for negative utility insert tolerances. Each of the first and second cutting edges is provided with a plurality of noses separated by gullets. The contour of the noses and gullets is predetermined to provide a predetermined thread form, such as a buttress thread form.

Each of the first and second planar faces are associated with an integral, pressed-in chip breaker in the form of a raised island, the incident face contour thereof corresponding to the nose-and-gullet contour of the respective cutting edge adjacent thereto.

The indexable threading insert is placed in a negative pocket of a toolholder, wherein the negative angle is nine and one-half degrees. The land of the active cutting edge is positively angled at nine and one-half degrees. Accordingly, the land of the active cutting edge becomes neutral in the areas that are perpendicular to the workpiece, elsewhere the active cutting edge remains slightly positive.

The chip breaker island is provided with a long delta drop and an incident angle of thirty degrees. With the indexable insert located in the aforementioned negative pocket, the resulting incident angle is thirty-nine and one-half degrees. This angle is optimum for providing excellent chip control, wherein chips are formed in manageable "C's" and "9's" and the stress and strain concentration is directed toward the middle of the chip. Thus, the chips deform away from the thread walls toward the center of the chip breaker's incident angle that is perpendicular to the workpiece.

Accordingly, it is an object of the present invention to provide an indexable, two sided threading insert.

It is an additional object of the present invention to provide a threading insert having a pressed-in chip breaker island.

It is another object of the present invention to provide an indexable, two sided threading insert having a pressed-in chip breaker island for each cutting edge thereof.

It is a further object of the present invention to provide an indexable, two cutting edge threading insert having a pressed-in chip breaker island for each cutting edge thereof, wherein chips produced during operation thereof are highly manageable.

It is a yet another object of the present invention to provide an indexable, two cutting edge threading insert having a pressed-in chip breaker island for each cutting edge thereof, wherein a positive land is provided perpendicular to the cutting edge.

It is still a further object of the present invention to provide an indexable, two cutting edge threading insert having a pressed-in chip breaker island for each cutting edge thereof, wherein an increased delta-drop and total maximum depth combine to provide chips during operation thereof which are highly manageable.

It is yet an additional object of the present invention to provide an indexable, two cutting edge threading insert having a pressed-in chip breaker island for each cutting edge thereof, and wherein chips produced during operation thereof are highly manageable, wherein buttress thread forms in a workpiece are provided thereby.

It is still another object of the present invention to provide an indexable, two cutting edge threading insert having a pressed-in chip breaker island for each cutting edge thereof, wherein each cutting edge has a positive land oriented at a predetermined angle and the chip breaker adjacent thereto has an incident angle, and wherein the pocket of the toolholder supporting the indexable threading insert has a negative angle of a magnitude equal to the predetermined angle, thereby providing selective neutrality of the land and a long incident angle of the adjacent chip breaker.

These and additional objects, features and benefits will become clear from the following description.

DETAILED DESCRIPTION OF THE PREFERRED EMBODIMENT

Figure 1:
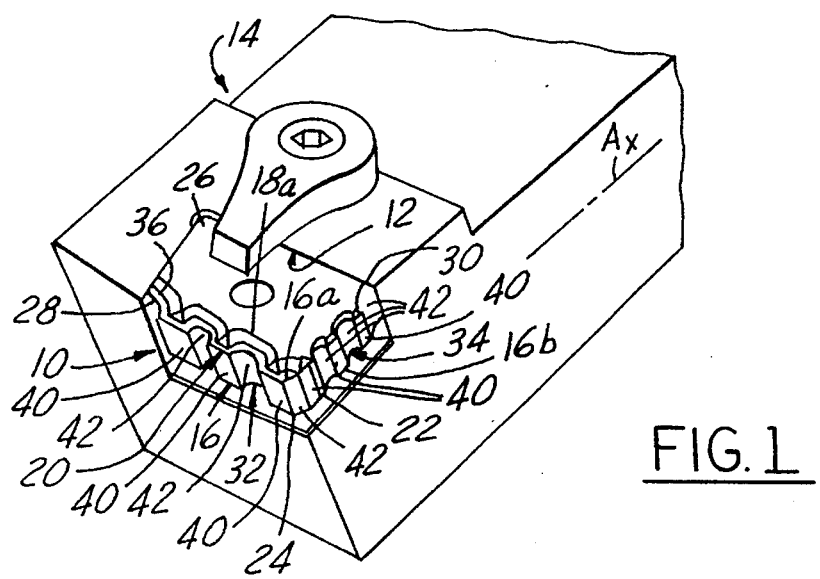
FIG. 1 is a perspective view of the indexable threading cutting insert according to the present invention, shown installed in the negative pocket of a toolholder.

Referring now to the Drawing, FIG. 1 generally depicts the indexable threading insert 10 according to the present invention, wherein it is shown in operation received in a pocket 12 formed at a forward end of a toolholder 14. The indexable insert 10 is composed of an insert body 16 and a pair of integral, pressed-in first and second chip breakers 18a, 18b located, respectively, at opposing sides 16a, 16b of the insert body. First and second cutting edges 20, 22 are provided at each of the opposing sides 16a, 16b of the insert body 16, each mutually adjoining a first corner 24. The integral first and second chip breakers 18a, 18b, are located, respectively, adjacent the first and second cutting edges 20, 22 in predetermined proximity thereto and are each provided with a predetermined contour corresponding to the contour of the respective first and second cutting edges to thereby provide optimum chip management as a respective one of the first and second cutting edges serves as an active cutting edge for engaging a workpiece. The indexable threading insert 10 is inversely symmetric about a diagonal between the first corner 24 and an opposite second corner 26. Accordingly, when the active cutting edge, first cutting edge 20 in FIG. 1, becomes dull or otherwise unacceptable, the indexable insert 10 is removed from the pocket 12, indexed and then replaced so that now the second cutting edge 22 is the active cutting edge for engaging a workpiece. The structure and function of the indexable insert 10 will now be further detailed with reference being additionally directed to FIGS. 2 through 6.

The indexable threading insert 10 is characterized by a general diamond shape, wherein the first and second corners 24, 26 are acute, and a third corner 28 and a fourth corner 30 located opposite the fourth corner, are obtuse. First and second insert faces 32, 34 are formed adjoining the first corner 24. The first cutting edge 20 is formed by the intersection of the first insert face 32 and a first land 36 formed in the first side 16a of the insert body 16. The second cutting edge 22 is formed by the intersection of the second insert face 34 and a second land 38 formed in the second side 16b of the insert body 16.

Each of the first and second cutting edges 20, 22 is identically provided with a predetermined contour for performing a preselected thread cutting job on a workpiece. The indexable insert 10 shown in the Drawing is directed to providing buttress thread forms in a workpiece. In this regard, the first and second cutting edges 20, 22 have a plurality of noses 40, separated by gullets 42, on either side thereof, respectively.

Figure 5:
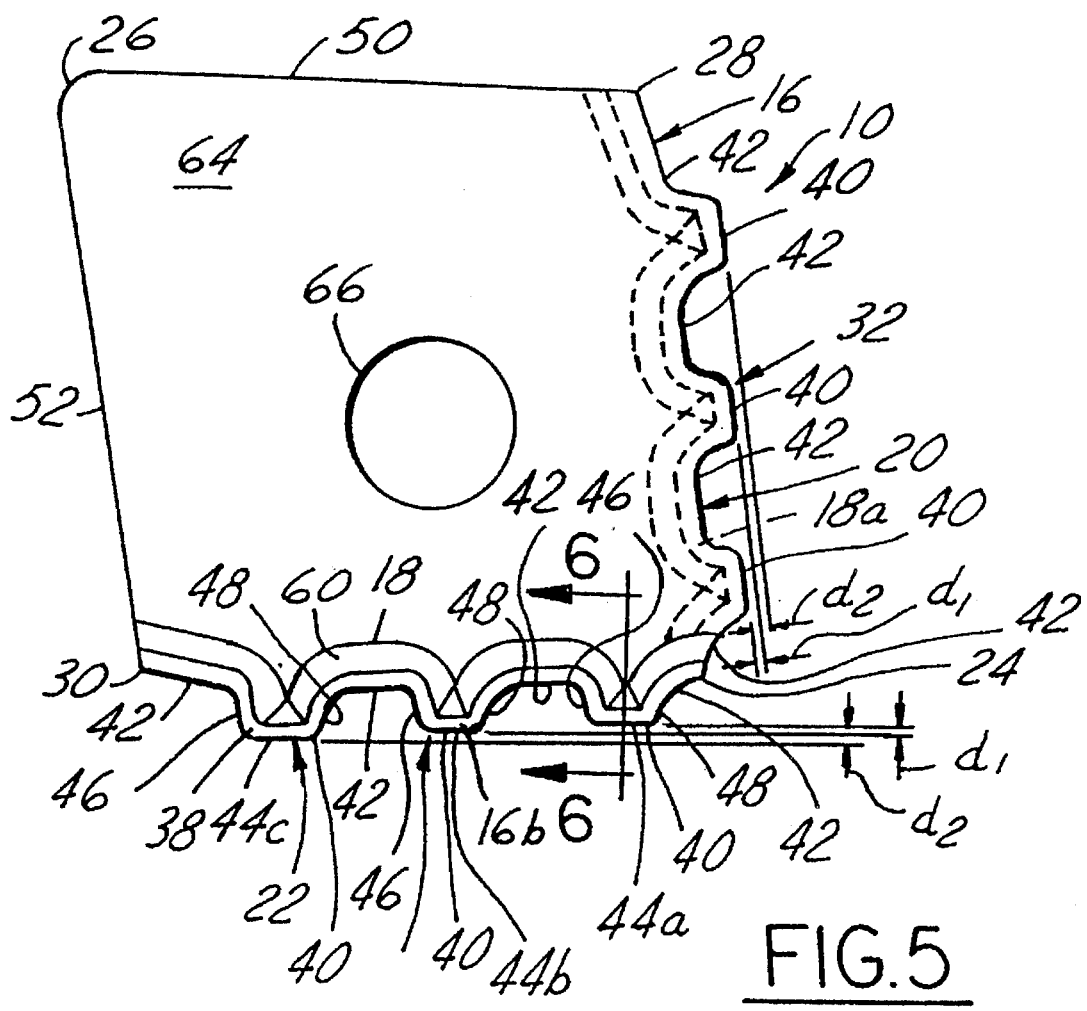
FIG. 5 is a bottom plan view of the indexable threading insert according to the present invention.

As shown in FIG. 5, the preferred embodiment of the first and second cutting edges 20, 22 are provided with three noses 40, wherein the shape of the noses and the respective gullet 42 on either side thereof provide buttress thread forms on a workpiece. Thus, each nose 40 is provided with a respective flat nose edge 44a, 44b, 44c for forming a flat thread root in the workpiece, a forward thread side forming edge 46 in perpendicular relation to the nose edge, and a rear thread side forming edge 48 at an acute angle with respect to the nose edge. A first nose edge 44a adjacent the first acute corner 24 performs an initial pass with respect to the workpiece, and projects to a first preselected location. A second nose edge 44b adjacent the first nose edge 44a performs a deeper pass with respect to the workpiece and projects a distance $d_1$ further than the first nose edge 44a. A third nose edge 44c adjacent the second nose edge 44b performs a final pass with respect to the workpiece and projects a distance $d_2$ further than the first nose edge 44a. It will be noted that the first and second insert faces 32, 34 follow the contour of the first and second cutting edges 20, 22, respectively.

While the first and second cutting edges contoured for forming buttress thread machining of a workpiece are shown by way of preferred example, it is clear that other thread forms, such as unified, sharp-vee, square, acme, and knuckle thread forms, may be provided in a workpiece by selection of a suitable contour of the first and second cutting edges.

Figure 2:
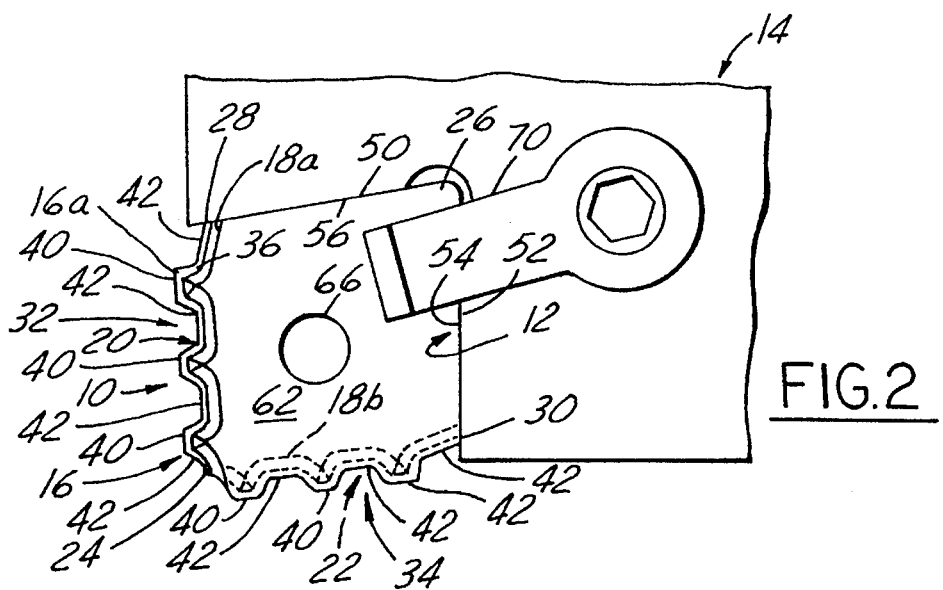
FIG. 2 is a top plan view of the indexable threading insert, shown installed in the negative pocket of a toolholder.

The insert body 16 is further provided with first and second insert sidewalls 50, 52 which mutually adjoin the second corner 26. The first and second insert sidewalls 50, 52 abut first and second pocket sidewalls 54, 56 of the toolholder 14, as shown in FIG. 2 to thereby locate the threading insert with respect to the pocket 12.

Figure 6:
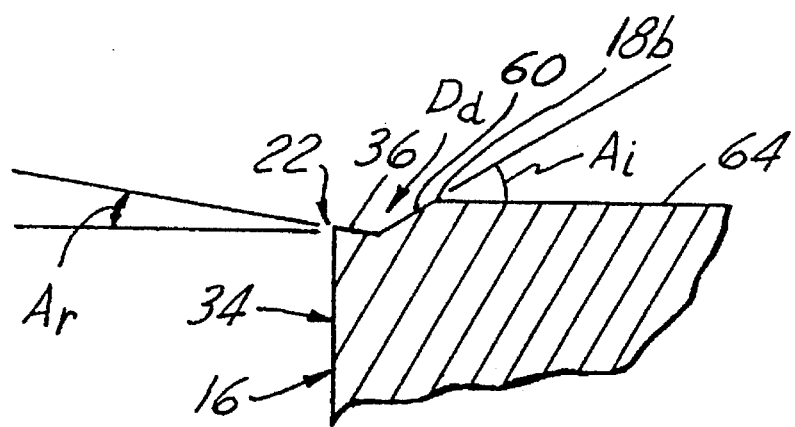
FIG. 6 is a sectional side view of the indexable threading insert seen along line 6—6 in FIG. 5, showing a cutting edge, the positive land and the delta drop of the chip breaker island thereof.

The first and second chip breakers 18a, 18b are each recessed from their respective first and second cutting edge 20, 22 and are each contoured to correspond to the aforementioned noses 40 and gullets 42 thereof. The recess of each of the first and second chip breakers 18a, 18b from their respective first and second cutting edge 20, 22 is defined by the first and second lands 36, 38, respectively, as best seen in FIGS. 5 and 6. The first and second lands 36, 38 have a positive rake angle $A_r$ of preferably nine and one-half degrees with respect to a plane parallel to the first and second planar faces 62, 64, respectively, as best shown in FIG. 6.

The first chip breaker 18a is characterized by a first incident face 58 and an adjoining first planar face 62. The second chip breaker 18b is characterized by a second incident face 60 and an adjoining second planar face 64. Each of the first and second planar faces 62, 64 are mutually parallel and are generally perpendicular to the first and second insert faces 32, 34. Each of the first and second incident faces 58, 60 has an incident angle $A_i$ of preferably thirty degrees with respect to its respective adjoining first and second planar face 62, 64. The combination of the first and second lands 36, 38 with its respective first and second incident face 58, 60 provides a delta drop $D_d$ adjacent each of the first and second cutting edges 20, 22.

It will be noted from the foregoing description and the accompanying Drawing, that the first insert face 32 extends between the first land 36 and the second planar face 64, while the second insert face 34 extends between the second land 38 and the first planar face 62.

The pocket 12 in the toolholder 14 is negative with respect to the toolholder, wherein the pocket has a negative pocket angle $A_p$ relative to the axis $A_x$ of the toolholder 14. The pocket angle $A_p$ has the same magnitude as the rake angle $A_r$. Accordingly, when the threading insert 10 is placed into the pocket 12, one of the first and second planar faces 62, 64 abuts the floor 12a of the pocket (or a spacer 68 located therebetween), and the portion of the land of the active cutting edge having an angle in parallel alignment with the angle of the pocket (that is, in alignment with the toolholder axis $A_x$) then becomes neutral while all other portions of the land remain positive; and the magnitude of the incident angle $A_i$ is increased by the incident angle to an effective incident angle of thirty nine and one-half degrees for that portion of the incident angle that is in parallel alignment with the pocket angle.

Figure 4:
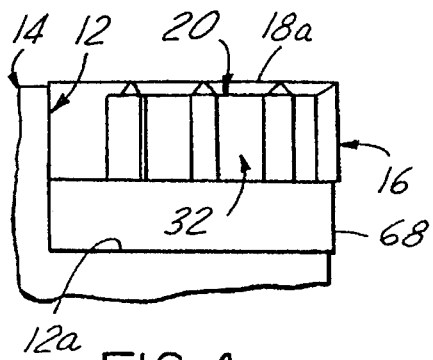
FIG. 4 is a front elevational view of the indexable threading insert, shown installed in the negative pocket of a toolholder.
Figure 3:
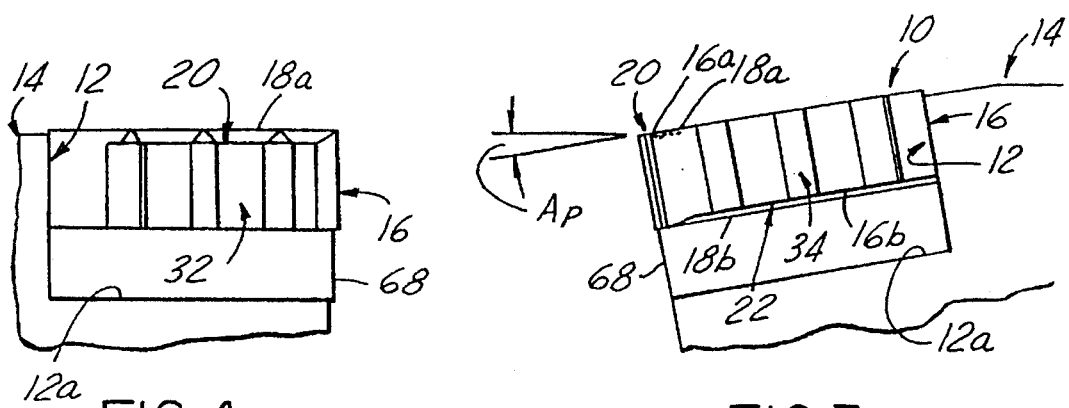
FIG. 3 is a side elevational view of the indexable threading insert, shown installed in the negative pocket of a toolholder.

A center bore 66 is provided in the threading insert 10, passing through each of the first and second planar faces 62, 64. The center bore 66 affords standard ANSI and ISO indexing, wherein an affixment bolt (not shown) is placed therein and threaded into a threaded affixment passage in the floor 12a of the pocket 12 in a conventional manner. As best shown in FIGS. 3 and 4, a spacer 68 is optionally provided between the floor 12a and the planar face facing theretoward to elevationally locate the opposite planar face so that a toolholder clamp 70 clampably abuts thereto, thereby affixing the threading insert within in the pocket 12 (in absence of an affixment bolt).

The threading insert 10 is fabricated by being pressed-in on both sides via a die, wherein both the insert body 16 and the first and second chip breakers 18a, 18b are integrally formed. The pressing is well to within ANSI and ISO standards inch for all critical mean dimensions, and the pressed-in first and second chip breakers are precisely placed with respect to their respective cutting edge.

In operation, the threading insert is placed in the pocket of the toolholder, wherein one of the first and second cutting edges is an active cutting edge in that it projects from a forward end of the toolholder. The threading insert is affixed with respect to the pocket via an affixment bolt or a toolholder clamp. The negative pocket angle $A_p$ of the pocket of the toolholder is equal in magnitude with the positive rake angle $A_r$ of the land, thereby providing proper clearance under the active cutting edge.

During engagement with a workpiece, the active cutting edge, at the nose and gullet components thereof, will cause the workpiece to be worked. The chips thereby produced will travel along the land adjoining the active cutting edge and then encounter the incident face of the adjacent chip breaker. The precisely configured delta-drop $D_d$ created by the neutral land and the tall angle $(A_i+A_p)$ of the incident face causes the worked material of the workpiece to curl into manageable chips ("C's" and "9's"). In this regard, the stress and strain concentration of the chips is directed toward the middle thereof, which effect requires, and is satisfied by, the depth provided by the delta drop $D_d$ (see FIG. 6).

The effective incident angle $(A_i+A_p)$ is critical: too much angle will cause over crowding of the chips, resulting in a loss of chip breaker performance; too little angle will cause loss of chip control. An optimum effective incident angle is between thirty-eight and forty-one degrees with respect to the toolholder axis. Accordingly, the effective incident angle of the incident face of the chip breaker when situated in the negative pocket of the toolholder is thirty-nine and one-half degrees, which is optimal for providing chip control.

Further, the active cutting edge has added strength in that the positive rake of the land adjoining thereto is neutral along all areas perpendicular to the workpiece, when placed in the negative pocket of the toolholder. Around all corner radiuses, as well as along the surfaces not perpendicular to the workpiece, the cutting edge remains slightly positive. This feature helps reduce force distributions in these critical areas of the thread form, as well as allowing the chips to deform away from the thread sides and more toward the center of the incident angle of the chip breaker that is perpendicular to the workpiece. When the first or second cutting edge which is serving as the active cutting edge becomes dull or otherwise unacceptable, the threading insert is removed from the pocket, indexed, and then reinserted into the pocket, wherein the other of the first and second cutting edges is now the active cutting edge.

To those skilled in the art to which this invention appertains, the above described preferred embodiment may be subject to change or modification. Such change or modification can be carried out without departing from the scope of the invention, which is intended to be limited by the scope of the appended claims.

What is claimed is:

1. An indexable threading insert with pressed-in chip breaker for providing a thread form on a workpiece, comprising:

an insert body having a first side and an opposite second side, said insert body further having a first corner, a second corner opposite said first corner, a third corner and a fourth corner opposite said third corner, said insert body having a pair of insert sidewalls which mutually adjoin said second corner, said insert body having a first insert face and a second insert face which mutually adjoin said first corner, a first cutting edge being formed at an intersection of said first insert face and said first side, a second cutting edge being formed at an intersection of said second insert face and said second side, said first cutting edge and said first face being provided with a predetermined contour for providing a predetermined thread form on a workpiece, said second cutting edge and said second insert face having said predetermined contour;

a first land inward of said first cutting edge and sloping at a predetermined rake angle toward said second side from said first edge, a second land inward of said second cutting edge and sloping at the predetermined rake angle toward said first side from said second edge, said predetermined rake angle being equal and opposite to an angle of inclination at which the insert is intended to be mounted for use, whereby when so mounted, portions of the land surface are at neutral rake when engaging the workpiece;

a first chip breaker integrally connected with said first side of said insert body, said first chip breaker comprising a first raised island comprising:

a first incident face having said predetermined contour, said first incident face being recessed a predetermined distance from said first cutting edge, thereby defining a constant land width; and a first planar face contiguously adjoining said first incident face, said first incident face being oriented at a predetermined incident angle with respect to said first planar face; and a second chip breaker integrally connected with said second side of said insert body, said second chip breaker comprising:

a second raised island comprising a second incident face having said predetermined contour, said second incident face being recessed said predetermined distance from said second cutting edge, thereby defining a constant land width; and a second planar face continuously adjoining said second incident face, said second incident face being oriented with respect to said second planar face at said predetermined incident angle, said first planar face being parallel with respect to said second planar face;

wherein said insert body, said first chip breaker and said second chip breaker are collectively inversely symmetrical with respect to a diagonal between said first and second corners.

2. The indexable threading insert with pressed-in chip breaker of claim 1 wherein said first and second angles are about nine and one-half degrees.

3. The indexable threading insert with pressed-in chip breaker of claim 2, wherein said first planar surface is generally perpendicular to said first insert face; wherein said second planar face is generally perpendicular to said second insert face; and wherein said predetermined incident angle is substantially thirty degrees.

4. The indexable threading insert with pressed-in chip breaker of claim 3, wherein said predetermined contour of said first and second cutting edges and said first and second insert faces comprises a plurality of noses, each nose of said plurality of noses being separated from each other by a gullet.

5. The indexable threading insert with pressed-in chip breaker of claim 4, wherein said predetermined contour provides buttress form threads on a workpiece.

6. The indexable threading insert with pressed-in chip breaker of claim 5, wherein said insert body is diamond shaped, wherein said first and second corners are acute and said third and fourth corners are obtuse.

7. An indexable threading insert with pressed-in chip breaker and toolholder therefor for providing a thread form on a workpiece, comprising:

a toolholder having a toolholder axis, said toolholder having a forward end, said forward end having a pocket formed therein, said pocket being angled with respect to said toolholder axis at a predetermined pocket angle;

an indexable threading insert with pressed-in chip breaker receivable in said pocket, comprising:

an insert body having a first side and an opposite second side, said insert body further having a first corner, a second corner opposite said first corner, a third corner and a fourth corner opposite said third corner, said insert body having a pair of insert sidewalls which mutually adjoin said second corner, said insert body having a first insert face and a second insert face which mutually adjoin said first corner, a first cutting edge being formed at an intersection of said first insert face and said first side, a second cutting edge being formed at an intersection of said second insert face and said second side, said first cutting edge and said first face being provided with a predetermined contour for providing a predetermined thread form on a workpiece, said second cutting edge and said second insert face having said predetermined contour;

a first land inward of said first cutting edge and sloping at a predetermined rake angle toward said second side from said first edge, a second land inward of said second cutting edge and sloping at the predetermined rake angle toward said first side from said second edge, said predetermined rake angle being such that when mounted in the pocket, portions of the land surface are at neutral rake relative to the workpiece;

a first chip breaker integrally connected with said first side of said insert body, said first chip breaker comprising a first raised island comprising: a first incident face having said predetermined contour, said first incident face being recessed a predetermined distance from said first cutting edge, thereby defining a constant land width; and a first planar face contiguously adjoining said first incident face, said first incident face having a predetermined incident angle with respect to said first planar face; and a second chip breaker integrally connected with said second side of said insert body, said second chip breaker comprising: a second raised island comprising a second incident face having said predetermined contour, said second incident face being recessed said predetermined distance from said second cutting edge, thereby defining a constant land width; and a second planar face continuously adjoining said second incident face, said second incident face having said predetermined incident angle, said first planar face being parallel with respect to said second planar face; and means for releasably affixing said indexable threading insert with pressed-in chip breaker within said pocket so that one of said first and second cutting edges projects therefrom to thereby provide an active cutting edge;

wherein said indexable threading insert with pressed-in chip breaker is inversely symmetrical with respect to a diagonal between said first and second corners; and wherein said pocket angle positions a portion of the incident face of the active cutting edge that is in parallel alignment with the negative angle of the pocket at an effective angle of incidence with respect to the toolholder axis equal to the sum of said predetermined pocket angle and said predetermined incident angle.

8. The indexable threading insert with pressed-in chip breaker and toolholder therefor of claim 7, wherein said first planar surface is generally perpendicular to said first insert face; wherein said second planar face is generally perpendicular to said second insert face; wherein said predetermined pocket angle is substantially nine and one-half degrees; wherein said predetermined rake angle is substantially nine and one-half degrees; and wherein said predetermined incident angle is substantially thirty degrees.

9. The indexable threading insert with pressed-in chip breaker and toolholder therefor of claim 8, wherein said predetermined contour of said first and second cutting edges and said first and second insert faces comprises a plurality of noses, each nose of said plurality of noses being separated from each other by a gullet.

10. The indexable threading insert with pressed-in chip breaker and toolholder therefor of claim 9, wherein said predetermined contour provides buttress form threads on a workpiece.

11. The indexable threading insert with pressed-in chip breaker and toolholder therefor of claim 10, wherein said insert body is diamond shaped, wherein said first and second corners are acute and said third and fourth corners are obtuse.

* * * * *